Nov. 11, 1969   B. B. BALDWIN   3,477,582
GRID STRUCTURE FOR FILTERS
Original Filed Feb. 26, 1965   3 Sheets-Sheet 1
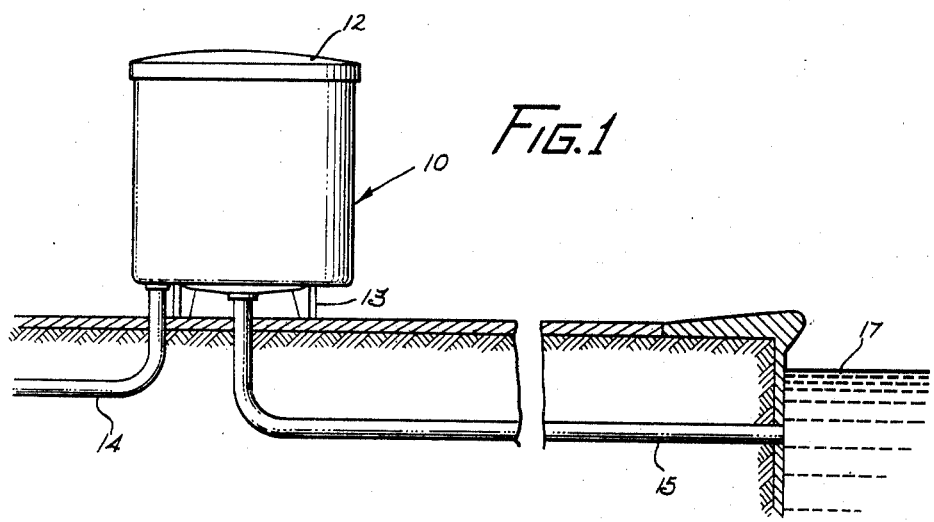
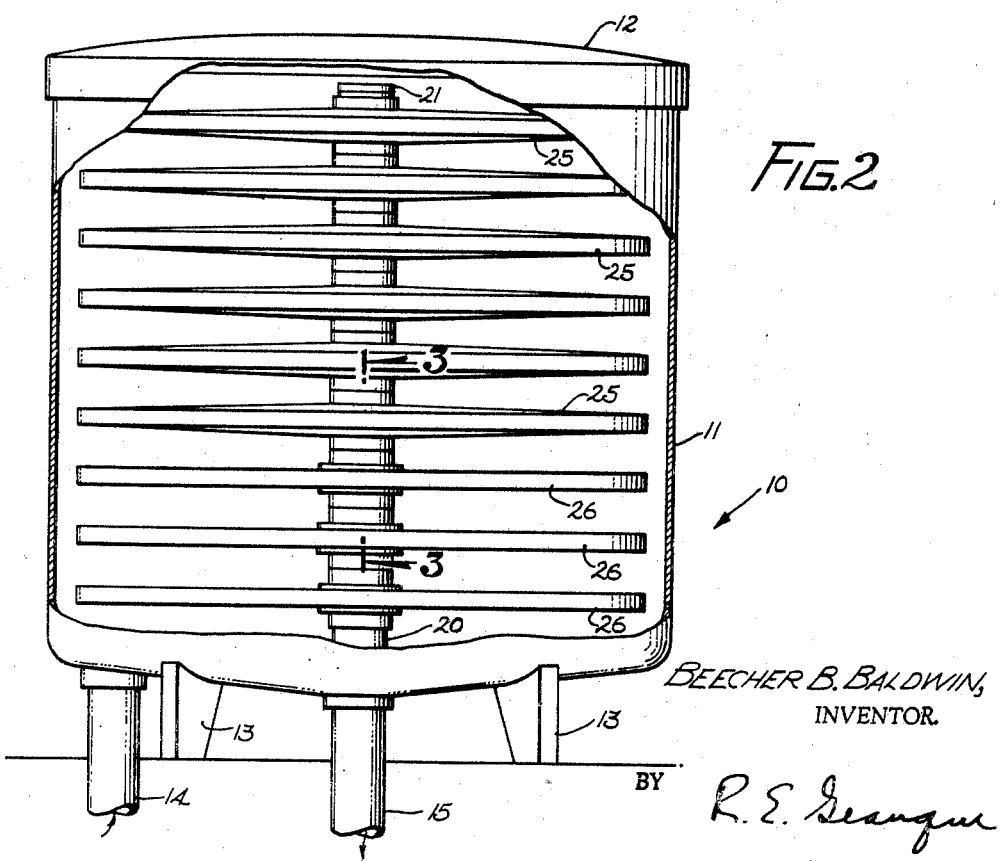
BEECHER B. BALDWIN,
INVENTOR.
BY R. E. Geangue
ATTORNEY

BEECHER B. BALDWIN,
INVENTOR.

BY R. E. Granger

ATTORNEY

Nov. 11, 1969   B. B. BALDWIN   3,477,582
GRID STRUCTURE FOR FILTERS
Original Filed Feb. 26, 1965   3 Sheets-Sheet 3

BEECHER B. BALDWIN,
INVENTOR.

BY R. E. Geangue

ATTORNEY

United States Patent Office 3,477,582
Patented Nov. 11, 1969

3,477,582
GRID STRUCTURE FOR FILTERS
Beecher B. Baldwin, Los Angeles, Calif., assignor to Universal Filtration Inc., Los Angeles, Calif., a corporation of California
Continuation of application Ser. No. 629,819, Apr. 10, 1967, which is a continuation of application Ser. No. 435,661, Feb. 26, 1965. This application June 3, 1968, Ser. No. 739,924
Int. Cl. B01d 39/08
U.S. Cl. 210—232
4 Claims

ABSTRACT OF THE DISCLOSURE

A replacement grid for filters of the type having a manifold pipe mounting a number of orignial disc-shaped filter grids in axially spaced side-by-side relation, the replacement grid having a porous grid member with a central opening of larger diameter than any manifold type on which the grid is to be installed, and replaceable tubular adaptors releasably engaged with opposite sides of the grid member, whereby the replacement grid may be installed on manifold pipes of various diameters and hole spacings in place of an inoperative original filter grid.

---

This application is a continuation of Ser. No. 629,819, filed Apr. 10, 1967, now abandoned, which was a continuation of Ser. No. 435,661, filed Feb. 26, 1965, and now abandoned.

This invention relates to a grid structure for filters and more particularly to a standard grid member and adaptors therefore which can replace the grid members in filters of different constructions.

A common type of filter construction consists of an upright manifold pipe having a plurality of openings around circumference locations spaced along its length and a grid member surrounds the openings at each location. Each original grid member consists of upper and lower flange members located above and below the plurality of openings at each location. The flange members fit snugly against the pipe and support a plurality of radially extending ribs. These ribs are covered with a cloth which is coated with a filter material in order to filter the water flowing from outside the grid through the grid and into the openings in the manifold. The diameter and length of the manifold and the size and spacing of the openings in the manifold vary with the filter manufacture and since the original grids are made to fit the particular filter construction, the grids vary in structure and spacing.

The present invention provides a standard grid member for replacement of a variety of original grid members in different filter constructions. Upper and lower adaptors permit the standard grid member to be placed at the proper location along the manifold in order to replace the grid member of the manufacturer's special design. The adaptors compensate for differences in thicknesses between the standard grid and the original grid and for differences between the size of the central opening in the standard grid and the manifold diameter. While a single standard grid thickness and size of central opening is desirable, several variations of each will provide standard grids which will replace a wide variety of original grids. The standard grids can have the same cloth covered rib construction as the original grid members for most filters.

It is therefore an object of the present invention to provide a grid member of standard construction which can replace original grid members of different constructions.

Another object of the invention is to provide a grid structure consisting of grid members and adaptors for mounting the grid members on manifolds of different constructions.

Another object of the invention is to provide a grid structure including a grid member and adaptors which can replace original grid members of different structure and still maintain the same flow of water through the filter.

These and other objects of the invention not specifically set forth above will become readily apparent from the accompanying description and drawings in which:

FIGURE 1 is a side elevational view of a filter installation;

FIGURE 2 is an enlarged elevational view, partly in section, showing the original grid structure at the top and the grid structure of the present invention at the bottom;

Figure 4:
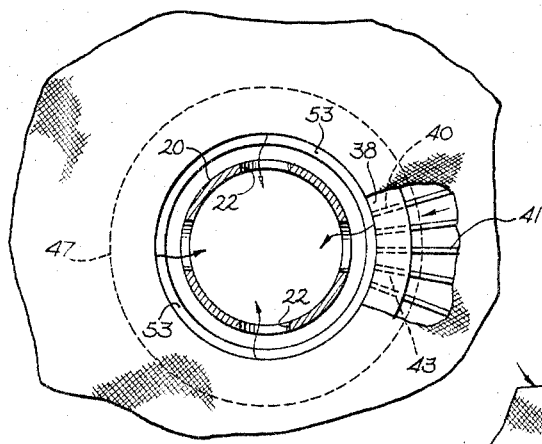
FIGURE 4 is a horizontal section along line 4—4 of FIGURE 3.

Referring to the embodiment of the invention illustrated in FIGURES 1–4, a filter 10 comprises a tank 11 having cover 12 and supported by legs 13. Water is pumped into the tank through line 14 and leaves the tank through line 15 which connects with pool 17. The pipe 15 extends upwardly into the tank to form a manifold 20 which is closed at the top by plug 21. It is understood that the tank 10 could be positioned horizontally in which case the pipe 15 would extend horizontally to connect with a horizontal manifold. A set of four openings 22 are located in manifold 20 at spaced locations along the manifold in order to receive water which has been filtered by passing through the grid members. The original tapered grid members 25 of the manufacturer's design are shown on the upper part of the manifold and the standard grid members 26, which serve as replacements for the original member, are shown in the lower part of the manifold. Each original grid member 25 has an upper annular flange member 28 which consists of a vertical portion 29 which snugly fits the manifold 20 and an outwardly extending portion 30 which supports a plurality of radially extending ribs 31. Each grid member 25 also has a lower annular flange member 32 which consists of a vertical portion 33 snugly fitting the manifold and of an outwardly extending portion 34 which cooperates with upper portion 30 in supporting the ribs 31. A cloth material 35 covers the ribs and is secured to the ribs and to the portions 30 and 34 so that water entering between the ribs 31 must pass through the cloth which is coated with a suitable filtering material. The filtered water enters to the manifold from the space between the ribs through the openings 22. When the portions 29 and 33 of adjacent original grids are in abutment, the grids are located opposite the openings 22 so that the grids can be stacked one on top of the other.

Figure 3:
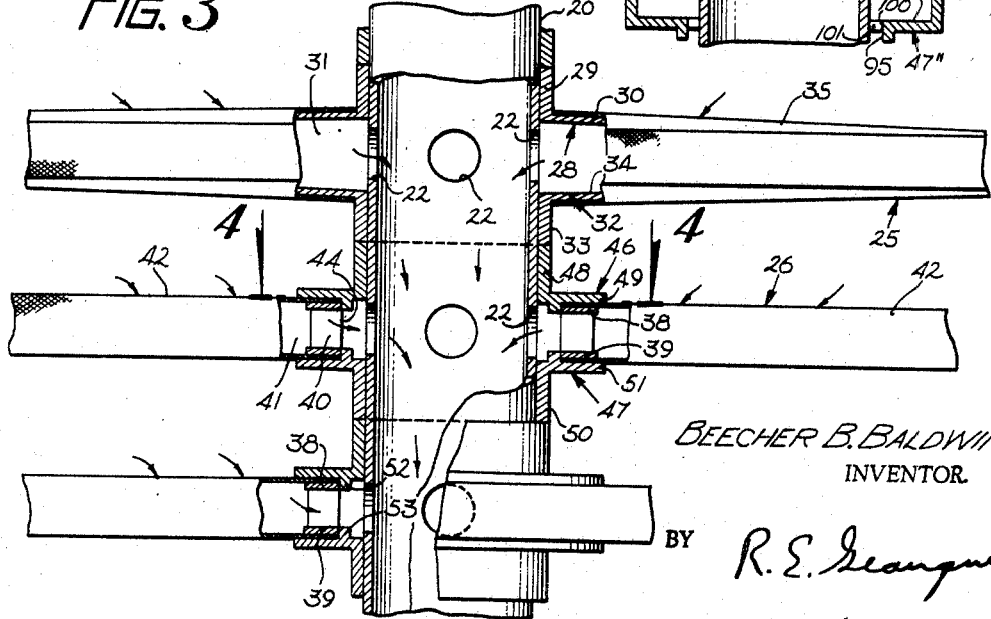
FIGURE 3 is a vertical section along line 3—3 of FIGURE 2 showing standard grid members and adaptors below an original grid member.

When the cloth 35 becomes worn, a grid member 25 can be replaced with a standard grid member 26. Each grid member 26 comprises upper and lower annular rings 38 and 39 between which are held the individual ends 40 of a plurality of radially extending ribs 41. The ribs and annular rings are covered by cloth 42 which is coated with filter material so that water can follow through the cloth and through the spaces 43 between the ends 40 into the openings 22 in the manifold. As illustrated in FIGURE 3, opening 44 in the rings 38 and 39 is larger than the manifold 20 since it is intended that the grid members be usable with manifolds which are larger or smaller in diameter than manifold 20.

In order to compensate for the difference in size between openings 44 and the manifold diameter, each grid member 26 is provided with upper and lower adaptors 46 and 47. Vertical portion 48 of adaptor 46 snugly engages the manifold 20 above a set of openings 22 and outwardly extending portion 49 covers the annular ring 38 and the cover cloth. In a similar manner, portion 50 of adaptor 47 snugly engages the manifold 20 below a set of openings 22 and outwardly extending portions 51 cover the annular ring 39 and cover cloth so that the grid member 26 is supported between portions 49 and 51. The opening 44 is located coaxially with the manifold 20 by circular flanges 52 and 53 projecting from adaptor portions 49 and 51, respectively, into end engagement with annular rings 38 and 39, respectively. It is therefore apparent that adaptors 46 and 47 provide a closed annular flow path between the spaces 43 in grid member 26 and the openings 22 in the manifold 20. The adaptors serve to locate the grid member 26 opposite the openings 22 since adaptor portions 48 and 50 abut opposite portions of either an adjacent original or standard grid structure and the length of portions 48 and 50 can be modified to compensate for different opening spacing in different manifolds. Also, the open diameter of the adaptors can be varied while the diameter of rings 38 and 39 remain fixed, in order to compensate for different manifold diameters. Thus, by making changes in dimensions of the adaptors 46 and 47, the grid member 26 can be utilized as a replacement on a variety of different manifold constructions in which the manifold diameter and spacing of openings vary.

Figure 5:
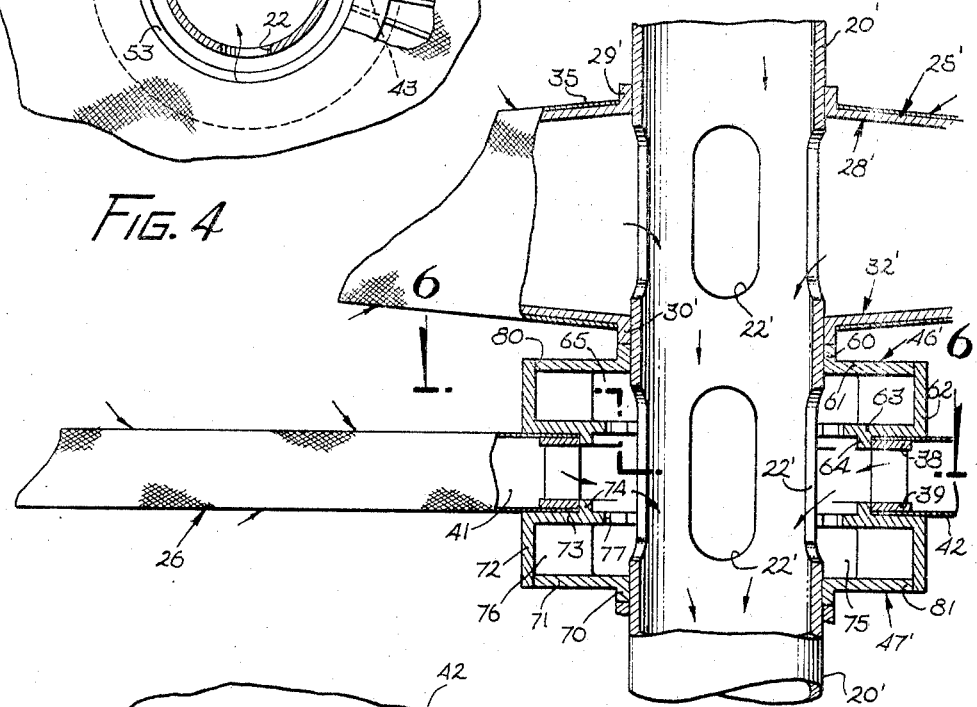
FIGURE 5 is a vertical sectional view of a modification of the invention applied to a manifold containing large slit openings.
Figure 6:
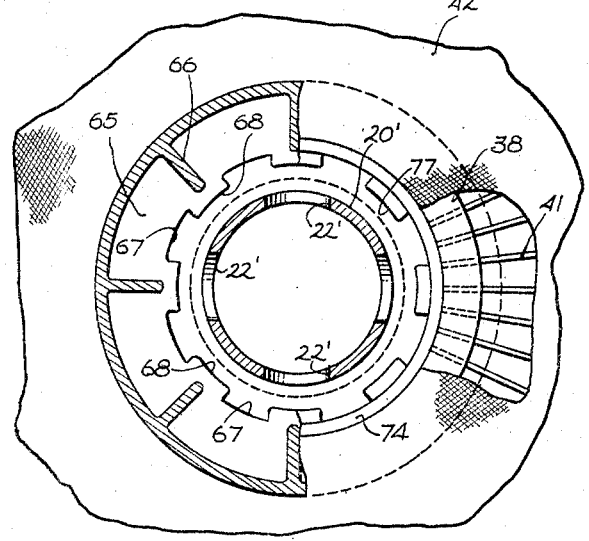
FIGURE 6 is a horizontal section along line 6—6 of FIGURE 5.

A modification of the invention is illustrated in FIGURES 5 and 6, wherein the grid member 26 serves as a replacement for an original grid member 25' applied to a manifold 20' containing sets of openings 22' in the form of elongated slits. The original grid members 25' are similar in construction to original grid members 25 except that annular members 28' and 32' are located further apart so as to be on opposite sides of elongated openings 22'. Also, since the length of the manifold between sets of openings is reduced, the portions 29' and 30' are reduced in height to fit between adjacent openings. Since the distance between annular rings 38 and 39 is considerably less than the longitudinal length of openings 22', enlarged adaptors 46' and 47' are required to cover the larger openings. Each adaptor 46' comprises an upstanding portion 60, an outwardly extending portion 61, an end portion 62, and outwardly extending portion 63 from which depends an annular flange 64. Thus, the adaptor defines an annular space 65 which contains a plurality of ribs 66 for rigidity and the space 65 is located opposite a part of openings 22'. The inner edge 67 of adaptor portion 63 is spaced outwardly from the manifold 20' so that water can flow from the grid member 26 into the chamber 65 and through the upper portions of openings 22. The edge 67 can carry a plurality of projections 68 to reduce the flow area if desired.

In a similar manner, the adaptor 47' has a downwardly extending portion 70 which snugly engages the manifold, an outwardly extending portion 71, an end portion 72, an outwardly extending portion 73, and an upwardly extending flange 74. Thus, adaptor 47' forms an annular space 75 which is located opposite the lower part of openings 22' and contains a plurality of radially spaced ribs 76 for rigidity. The inner edge 77 of adaptor portion 73 is spaced outwardly from the manifold 20' so that water can flow into the annular space 75 and into the lower portions of 22'. The flanges 64 and 74 serve to hold the annular rings 38 and 39 of the grid member 26 concentrically of the axis of manifold 20'.

The upwardly extending portion 60 of adaptor 46' and the downwardly extending portion 70 of manifold 47' engage opposite portions 29' and 30' of adjacent original grid members 25' in order to properly space the standard grid members 26 from the original grid members 25. By utilizing the enlarged adaptors 46' and 47', a standard grid member 26 can be used as a replacement for the wider grid member 25' as well as for the original grid member 25 and it is only necessary to change the structure of the adaptors. In order to facilitate the construction of the adaptors 46' and 47', the adaptors can be fabricated in two pieces and secured together at locations 80 and 81 respectively.

Figure 8:
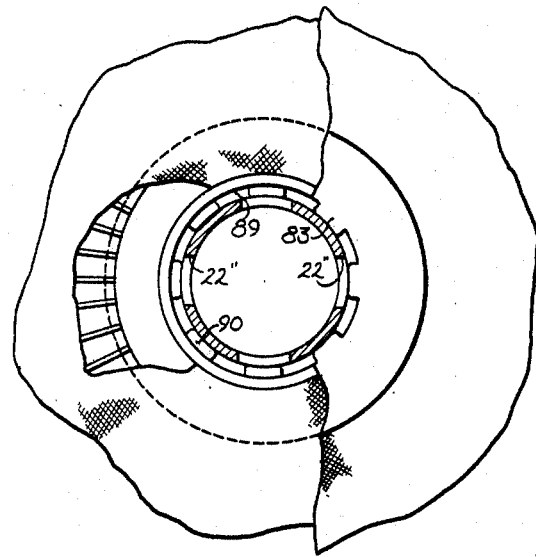
FIGURE 8 is a horizontal section along line 8—8 of FIGURE 7.
Figure 7:
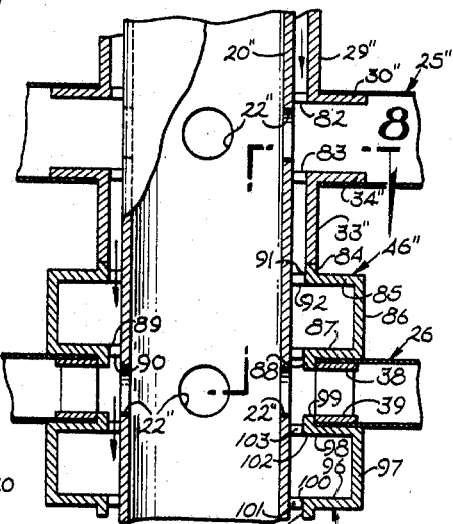
FIGURE 7 is a vertical sectional view of another modification of the invention applied to a filter in which water flows on the outside of the manifold.

FIGURES 7 and 8 illustrate another embodiment of the invention in which the standard grid member 26 can be utilized in filter constructions in which water flows from the original grid member 25" through openings 22" as well as along the outside of manifold 20". The portions 29" and 33" of grid member 25" are spaced outwardly from the manifold 20" by a plurality of spaced lips 82 and 83, respectively. The portions 30" and 34" are located opposite openings 22" which are somewhat smaller than the width of the grid member 25' and the filtered water flows through the openings 22" and also flows downwardly past the lips 82 and 83 around the outside of the manifold 20". Modified adaptors 46" and 47" can be utilized along with the standard grid member 26 to also provide flow through openings 22" as well as flow around outside of the manifold.

Adaptor 46" comprises an upwardly extending flange 84 which engages portion 33" of the original grid member 25" and also comprises an outwardly extending portion 85, an end portion 86, an outwardly extending portion 87, and downwardly extending flange 88. The inner edge 89 of portion 87 carries a plurality of spaced lips 90 and the inner edge 91 of portion 85 carries a plurality of spaced lips 92. Lips 90 and 92 engage the outer surface of manifold 20" to provide a space for water to flow downwardly along the outer circumference of the manifold past the adaptor 46". In a similar manner, the manifold 47" contains downwardly extending flange 95, outwardly extending portion 96, end portion 97, and outwardly extending portion 98 carrying upwardly extending flange 99. The inner edge 100 of portion 96 carries a plurality of spaced lips 101 and inner edge 102 of portion 98 carries a plurality of spaced lips 103. The space provided by lips 101 and 103 permits water to flow along the outside of the manifold past the adaptor 47". Water also flows directly from the grid member 26 directly through the openings 22". The rings 38 and 39 of the standard grid member 26 are located concentrically of the manifold 20" by flanges 88 and 99 of the adaptor 46" and 47", respectively, and are supported opposite openings 22" by the portions 87 and 98 of the adaptors. The longitudinal location of the grids is determined by the abutment of the flanges 84 and 95 with the flanges 29" and 30" of adjacent original grid members 25" or with the flanges 84 and 95 of adjacent standard grids 26. It is therefore apparent that the modification of FIGURES 7 and 8 permits the same flow of water that is obtained with the original grid members 25".

The standard grid member 26 of the present invention can be utilized with filter constructions which have only inside manifold flow or both inside and outside manifold flow. By modifying the shape and dimensions of the two adaptors, the standard grid member 26 can be properly located with respect to the openings in the manifold and water can be directed to smaller or larger openings which have different spacing depending on the particular filter construction. In some cases, the adaptors for the standard grid member will be modified only by a change in dimension to be usable with different grid structures while in other cases, the structure of the adaptors will be modified to adapt for enlarged manifold openings or for inside and outside manifold flow. The adaptors provide for proper spacing of the standard grid member from the original grid members and for the same type of water flow in or around the manifold so that the standard grid member plus the adaptors provide the same operation as the original grid members. Basically, the adaptors provide for placing of the grid member relative to the openings and for continuity of water flow regardless of the manifold and original grid structure. Various other modifications are contemplated by those skilled in the art without departing from the spirit and scope of the invention.

What is claimed is:

1. A replacement filter grid construction adapted to accommodate manifolds of different constructions and opening arrangements in various types of filters for replacement of individual original grids mounted on the manifolds in predetermined relation to the opening arrangements, said filter grid construction comprising: a replacement filter grid member having two center supports with central openings therein larger than any one of said manifolds for loosely receiving the same and spaced apart to define an annular water discharge passage; and a pair of adaptors individual to said replacement grid member and disposable with an adaptor on each side thereof adjacent one of said center support members and engageable with the replacement grid member for supporting the same therebetween; each adaptor comprising projecting structure extending into the central opening of the adjacent center support member and engageable with the periphery thereof, and surface-bearing structure extending in a direction opposite to said projecting structure and surrounding the manifold associated with the grid being replaced; said projecting structure comprising an annular flange coaxial with said surface bearing structure for disposing said replacement grid member coxially with respect to said associated manifold, said surface-bearing structure comprising a continuous surface in snug-fitting water-tight relationship to the circumference of said associated manifold, the overall dimensions of said adaptors and replacement grid member along said associated manifold being equal to the distance thereon occupied by the grid being replaced and its mounting means; whereby said replacement grid member may be mounted on said associated manifold in the same predetermined relationship the replaced grid bore thereto.

2. The filter grid construction as defined in claim 1, wherein each said adaptor further comprises a first transverse portion from which said projecting structure extends, said transverse portion having the form of an annular flange; and a second transverse portion spaced from said first transverse portion and supporting said surface-bearing structure.

3. The filter grid construction as defined in claim 2, wherein said transverse portions are of annular form and are separated by an intermediate portion comprising a cylindrical wall concentric with said annular flange.

4. A replacement filter grid construction adapted to accommodate manifolds of different constructions and opening arrangements in various types of filters for replacement of individual original grids mounted on the manifolds in predetermined relation to the opening arrangements, said filter grid construction comprising: a replacement filter grid member having two center supports with central openings therein larger than any one of said manifolds for loosely receiving the same and spaced apart to define an annular water discharge passage; and a paid of adaptors individual to said replacement grid member and disposable with an adaptor on each side thereof adjacent one of said center support members and engageable with the replacement grid member for supporting the same therebetween; each adaptor comprising an annular wall, said annular wall being parallel to the walls of the associated manifold and spaced outwardly therefrom, a first transverse wall extending radially inwardly from said annular wall, a second transverse wall extending radially inwardy from said annular wall and parallel to said first transverse wall, said transverse walls being spaced apart to define a chamber therebetween, at least one of said transverse walls having an annular projecting ridge formed thereon, said ridge being coaxial with said annular wall and being constructed and arranged to extend into the central opening of the adjacent center support of the replacement grid member and engage the periphery thereof, said projecting ridge structure of the adaptors maintaining the associated replacement grid member in coaxial relationship with respect to the associated manifold, and at least one of said transverse walls having a plurality of spaced lip members formed thereon and extending inwardly therefrom, said spaced lip members being constructed and arranged to engage the outer surface of the associated manifold, space the adaptors therefrom, and provide a fluid passageway along the outer surface of the associated manifold between the adaptors and said manifold, said adaptors being constructed and arranged to provide a fluid tight seal between themselves and adjacent filtering grids or mounting structure carried on the manifold.

References Cited

UNITED STATES PATENTS 1,792,797   2/1931   Armstrong _____ 210—487

FOREIGN PATENTS 28,649   12/1932   Netherlands.

REUBEN FRIEDMAN, Primary Examiner

W. S. BRADBURY, Assistant Examiner

U.S. Cl. X.R.

210—331, 347, 487